(12) United States Patent
Fu et al.

(10) Patent No.: US 9,225,367 B2
(45) Date of Patent: Dec. 29, 2015

(54) DECISION FEEDBACK EQUALIZER AND RECEIVER

(71) Applicant: Huawei Technologies Co., Ltd., Shenzhen, Guangdong (CN)

(72) Inventors: Shengmeng Fu, Wuhan (CN); Haili Wang, Wuhan (CN); Shiyu Xie, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/747,518

(22) Filed: Jun. 23, 2015

(65) Prior Publication Data

US 2015/0288395 A1 Oct. 8, 2015

Related U.S. Application Data

(63) Continuation of application No. PCT/CN2012/087920, filed on Dec. 28, 2012.

(51) Int. Cl.

| H03H 7/30 | (2006.01) |
| H03H 7/40 | (2006.01) |
| H03K 5/159 | (2006.01) |
| H04B 1/10 | (2006.01) |
| H04L 25/03 | (2006.01) |
| H04B 10/60 | (2013.01) |

(Continued)

(52) U.S. Cl.
CPC .............. *H04B 1/10* (2013.01); *H04B 10/2575* (2013.01); *H04B 10/27* (2013.01); *H04B 10/60* (2013.01); *H04L 25/03057* (2013.01)

(58) Field of Classification Search
CPC .......................... H04L 25/03057; H04L 27/06

USPC .................................. 375/229-234, 316, 324
See application file for complete search history.

(56) References Cited

U.S. PATENT DOCUMENTS

| 7,242,712 B1 | 7/2007 | Katic |
| 7,286,620 B2 | 10/2007 | Cranford, Jr. et al. |

(Continued)

FOREIGN PATENT DOCUMENTS

| CN | 101162920 A | 4/2008 |
| WO | WO 2012/102258 A1 | 8/2012 |

OTHER PUBLICATIONS

James F. Buckwalter, et al., "Analysis and Equalization of Data-Dependent Jitter", IEEE Journal of Solid-State Circuits, vol. 41, No. 3, Mar. 2006, p. 607-620.

*Primary Examiner* — Freshteh N Aghdam

(57) ABSTRACT

Embodiments of the present invention provide a decision feedback equalizer, which includes: a receive end, configured to receive a first differential signal, and input the first differential signal to the superimposer; a superimposer, configured to superimpose the first differential signal on a square-wave signal output by a adjusting unit to obtain a second differential signal; the adjusting unit, configured to perform phase and/or amplitude adjustment for a second square-wave signal; the first decision device is configured to compare a voltage amplitude of the second differential signal with a set value, and output a first square-wave signal; the second decision device is configured to compare the voltage amplitude of the second differential signal with a voltage amplitude of a signal adjusted by the adjusting unit, and input an obtained second square-wave signal to the adjusting unit. The embodiments of the present invention can reduce data edge jitter.

13 Claims, 4 Drawing Sheets

(51) Int. Cl.
　　　*H04B 10/27*　　(2013.01)
　　　*H04B 10/2575*　(2013.01)

(56) References Cited

U.S. PATENT DOCUMENTS

| | | | | |
|---|---|---|---|---|
| 7,394,849 | B2* | 7/2008 | Ibragimov et al. | 375/233 |
| 8,050,318 | B2* | 11/2011 | Phanse et al. | 375/232 |
| 2002/0070765 | A1* | 6/2002 | Tsujikawa | 327/66 |
| 2005/0152488 | A1 | 7/2005 | Buckwalter et al. | |
| 2006/0198478 | A1 | 9/2006 | Neurohr et al. | |
| 2010/0202506 | A1* | 8/2010 | Bulzacchelli et al. | 375/233 |
| 2012/0033685 | A1* | 2/2012 | Doblar et al. | 370/535 |
| 2013/0094561 | A1* | 4/2013 | Raphaeli et al. | 375/233 |
| 2013/0308694 | A1 | 11/2013 | Amamiya | |

* cited by examiner

DECISION FEEDBACK EQUALIZER AND RECEIVER

CROSS-REFERENCE TO RELATED APPLICATIONS

This application is a continuation of International Application No. PCT/CN2012/087920, filed on Dec. 28, 2012, which is hereby incorporated by reference in its entirety.

TECHNICAL FIELD

Embodiments of the present invention relate to the field of communications technologies, and in particular, to a decision feedback equalizer and a receiver.

BACKGROUND

As digital signal technologies develop towards a direction of high speed and large capacity, the need of a high speed signal processing technology is becoming increasingly urgent. Intersymbol interference (Inter Symbol Interference, ISI) generated during signal transmission is a key factor that constrains signal rate improvement. The ISI may cause pulse broadening, lead to instability of a voltage amplitude of a signal, and bring about data edge jitter of the signal, so that a bit error rate (Bit Error Rate, BER) of a channel increases.

In the prior art, a differential decision feedback equalizer is used to perform delay processing on a received differential signal and feed back a processed differential signal to a receive end, and the processed differential signal is superimposed on a differential signal received by the receive end. However, the method may cause great data edge jitter.

SUMMARY

Embodiments of the present invention provide a decision feedback equalizer and a receiver, which can reduce data edge jitter.

According to a first aspect, an embodiment of the present invention provides a decision feedback equalizer, including: a receive end, a superimposer, an adjusting unit, a first decision device and a second decision device, where the receive end is configured to receive a first differential signal, synchronize a local clock with a frequency of the first differential signal to make a cycle of the local clock consistent with a cycle of the first differential signal, and input the first differential signal to the superimposer; the superimposer is configured to superimpose the first differential signal input by the receive end on a square-wave signal output by the adjusting unit to obtain a second differential signal, and separately input the second differential signal to a differential input end of the first decision device and a differential input end of the second decision device; the adjusting unit is configured to perform phase and/or amplitude adjustment for a second square-wave signal output by the second decision device, and separately input a square-wave signal obtained after the adjustment to the superimposer and a feedback input end of the second decision device; the first decision device is configured to compare a voltage amplitude of the second differential signal input to the differential input end of the first decision device with a set value, and output a first square-wave signal; and the second decision device is configured to compare a voltage amplitude of the second differential signal input to the differential input end of the second decision device with a voltage amplitude of a square-wave signal that is input to the feedback input end and is adjusted by the adjusting unit, and input an obtained second square-wave signal to the adjusting unit.

In a first possible implementation manner of the first aspect, the adjusting unit is specifically configured to: perform phase delay at least once for the second square-wave signal output by the second decision device, where a phase is delayed for an integral multiple of the cycle of the local clock each time, add up at least one obtained signal, and then separately input a signal obtained after the adding-up to the superimposer and the feedback input end of the second decision device.

According to the first possible implementation manner of the first aspect, in a second possible implementation manner, the adjusting unit includes: a first delay module, a first coefficient module and a first adder, where the first delay module is configured to perform phase delay for the second square-wave signal, where the phase is delayed for the integral multiple of the cycle of the local clock, and input an obtained signal to the first coefficient module; the first coefficient module is configured to adjust a voltage amplitude of a signal that is adjusted and then output by the first delay module, and input an obtained signal to the first adder; and the first adder is configured to add up signals input by a plurality of first coefficient modules, and separately input an obtained signal to the superimposer and the feedback input end of the second decision device.

According to the second possible implementation manner of the first aspect, in a third possible implementation manner, the first coefficient module is configured to multiply the voltage amplitude of the signal input by the first delay module by $\alpha n$, where a value of $\alpha n$ is a ratio of a value of a unit impulse response at a current sampling moment to a peak value of the unit impulse response, n is a numerical value of the integral multiple of the cycle of the local clock, n is an integer, and the current sampling moment is n times the cycle of the local clock.

According to the second or third possible implementation manner of the first aspect, in a fourth possible implementation manner, a plurality of first delay modules is connected in series, an input end of each of the first coefficient modules is connected to an output end of one of the first delay modules, and an output end of each of the first coefficient modules is connected to an input end of the first adder.

According to the second, third or fourth possible implementation manner of the first aspect, in a fifth possible implementation manner, each of the first delay modules delays the signal for an equal time, and numbers of first delay modules between adjacent first coefficient modules are equal.

In a sixth possible implementation manner of the first aspect, the adjusting unit is specifically configured to: perform phase delay at least once for the second square-wave signal output by the second decision device, where a phase is delayed for an integral multiple of the cycle of the local clock each time, add up at least one obtained signal, and then input a signal obtained after the adding-up to the superimposer; or perform phase delay at least once for the second square-wave signal output by the second decision device, where a phase is delayed for an odd multiple of a half cycle of the local clock each time, add up at least one obtained signal, and then input a signal obtained after the adding-up to the feedback input end of the second decision device.

According to the sixth possible implementation manner of the first aspect, in a seventh possible implementation manner, the adjusting unit includes: a second delay module, a second coefficient module, a third coefficient module, and a second adder, where the second delay module is configured to perform phase delay for the second square-wave signal, where the phase is delayed for the odd multiple of the half cycle of the local clock; the second coefficient module is configured to adjust a voltage amplitude of a signal that is adjusted and then output by an even number of second delay modules, and input an obtained signal to the superimposer; the third coefficient module is configured to adjust a voltage amplitude of a signal that is adjusted and then output by an odd number of second delay modules, and input an obtained signal to the second adder; and the second adder is configured to add up signals input by a plurality of third coefficient modules, and input an obtained signal to the feedback input end of the second decision device.

According to the seventh possible implementation manner of the first aspect, in an eighth possible implementation manner, the second coefficient module is configured to multiply the voltage amplitude of the signal that is adjusted and then output by the even number of second delay modules, by $\alpha n$, where a value of $\alpha n$ is a ratio of a value of a unit impulse response at a current sampling moment to a peak value of the unit impulse response, n is a numerical value of the integral multiple of the cycle of the local clock, n is an integer, and the current sampling moment is n times the cycle of the local clock; and the third coefficient module is configured to multiply the voltage amplitude of the signal that is adjusted and then output by the odd number of second delay modules, by $(\beta m - 0.5)$, where a value of $\beta m$ is a ratio of a value of a unit impulse response at a current sampling moment to a peak value of the unit impulse response, m is a numerical value of the odd multiple of the half cycle of the local clock, m is an odd number, and the current sampling moment is m times the half cycle of the local clock.

According to the seventh or eighth possible implementation manner of the first aspect, in a ninth possible implementation manner, a plurality of second delay modules is connected in series, an input end of each second coefficient module is connected to an output end of an even number-th second delay module, and an output end of each second coefficient module is connected to the superimposes; and an input end of each of the third coefficient modules is connected to an output end of an odd number-th second delay module, and an output end of each of the third coefficient modules is connected to the second adder.

According to the seventh, eighth or ninth possible implementation manner of the first aspect, in a tenth possible implementation manner, each of the second delay modules delays the signal for an equal time, numbers of second delay modules between adjacent second coefficient modules are equal, and numbers of third delay modules between adjacent second coefficient modules are equal.

According to a second aspect, an embodiment of the present invention provides a receiver, including: an optical-to-electrical converter, the decision feedback equalizer according to any one of the first to ninth implementation manners, and a clock data recovery module; where the optical-to-electrical conversion module is configured to convert a received optical signal into an electrical signal, and input the electrical signal to the decision feedback equalizer as a first differential signal; and the clock data recovery module is configured to receive a first square-wave signal output by a first decision device in the decision equalizer, and synchronize a local clock with the first square-wave signal.

In a first possible implementation manner of the second aspect, the receiver is arranged on an optical line terminal OLT, an optical network unit ONU or an optical network terminal ONT.

In the decision feedback equalizer and the receiver provided by the embodiments of the present invention, one decision device and a superimposer are adopted to form a feedback loop, so as to adjust a differential signal received by a receive end, and another decision device is adopted as an output decision device of the decision feedback equalizer and outputs a signal obtained after the adjustment, so that signal decision points after the adjustment are located in proper positions, thereby decreasing jitter of an output differential signal.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION

To make the objectives, technical solutions, and advantages of the embodiments of the present invention clearer, the following clearly and describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
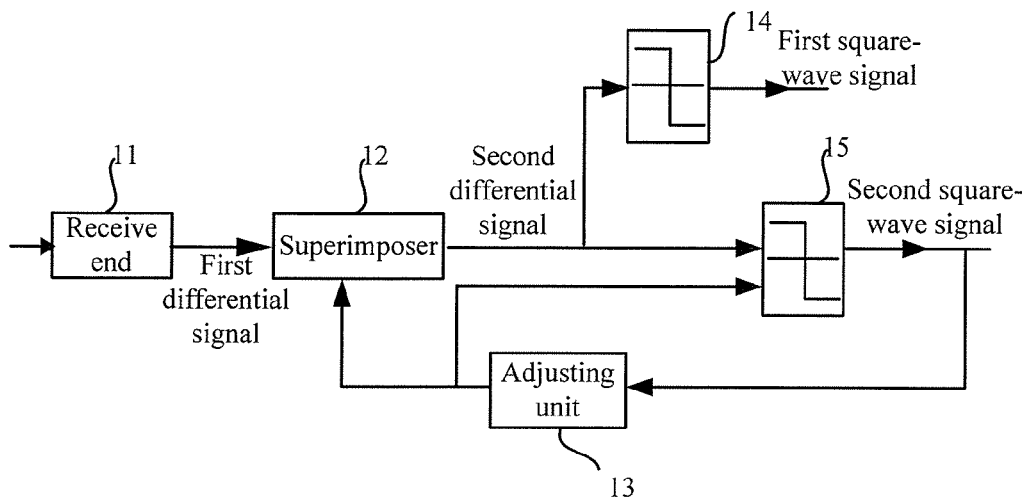
FIG. 1 is a schematic structural diagram of a first embodiment of a decision feedback equalizer according to the present invention.

FIG. 1 is a schematic structural diagram of a first embodiment of a decision feedback equalizer according to the present invention. As shown in FIG. 1, the decision feedback equalizer includes: a receive end 11, a superimposer 12, an adjusting unit 13, a first decision device 14 and a second decision device 15.

The receive end 11 is configured to receive a first differential signal, synchronize a local clock with a frequency of the first differential signal to make a cycle of the local clock consistent with a cycle of the first differential signal, and input the first differential signal to the superimposer.

The superimposer 12 is configured to: superimpose the first differential signal input by the receive end 11 on a square-wave signal output by the adjusting unit 13 to obtain a second differential signal; and separately input the second differential signal to a differential input end of the first decision device 14 and a differential input end of the second decision device 15. The adjusting unit 13 is configured to perform phase and/or amplitude adjustment for a second square-wave signal output by the second decision device 15, and separately input a square-wave signal obtained after the adjustment to the superimposer 12 and a feedback input end of the second decision device 15.

The first decision device 14 is configured to compare a voltage amplitude of the second differential signal input to the differential input end of the first decision device 14 with a set value, and output a first square-wave signal.

The second decision device 15 is configured to compare a voltage amplitude of the second differential signal input to the differential input end of the second decision device 15 with a voltage amplitude of a square-wave signal that is input to the feedback input end and is adjusted by the adjusting unit 13, and input an obtained second square-wave signal to the adjusting unit 13.

The decision feedback equalizer according to this embodiment of the present invention may be arranged on various types of optical network devices, for example, may be arranged on an optical line terminal (Optical Line Terminal, OLT), may be arranged on an optical network unit (Optical Network Unit, ONU), and may also be arranged on an optical network terminal (Optical network terminal, ONT). The decision feedback equalizer may perform amplitude and/or phase adjustment for a differential signal sent by a transmit end.

The decision feedback equalizer according to this embodiment of the present invention includes one feedback loop and one output link. The superimposer 12, an output end of the second decision device 15, and the adjusting unit 13 form one feedback loop, which is used to adjust a phase and/or a voltage amplitude of the second square-wave signal output by the output end of the second decision device 15; the output end of the second decision device 15, the adjusting unit 13, the superimposer 12, and the first decision device 14 form one output link, which is used to compare the signal adjusted by the foregoing feedback loop with a set value by using the first decision device 14, to output a more ideal first square-wave signal, so as to decrease jitter of the first square-wave signal output by the first decision device 14.

After the differential signal sent by the transmit end is transmitted through a transmission link, the differential signal received by the receive end may be mixed with an interference signal, so that the differential signal is distorted. Therefore, the receive end needs to adjust the received differential signal.

The first decision device 14 and the second decision device 15 may be implemented by adopting various existing differential comparers, or by adopting logic circuits formed by logic components. It should be noted that, because what is received by the decision feedback equalizer according to this embodiment of the present invention is a differential signal, both the first differential signal and the second differential signal involved in this embodiment of the present invention include two signals. It may be understood that, the receive end 11 has input ports and output ports corresponding to the two signals in the first differential signal. The superimposes 12 has input ports corresponding to the two signals in the first differential signal, and has output ports corresponding to the two signals in the second differential signal. The first decision device 14 and the second decision device 15 separately have input ports and output ports corresponding to the two signals in the second differential signal. In addition, the first square-wave signal output by the first decision device 14 actually includes two square-wave signals, and the two square-wave signals each correspond to one signal in the second differential signal received by the first decision device 14. Similarly, the second square-wave signal output by the second decision device 15 actually includes two square-wave signals, and the two square-wave signals each correspond to one signal in the second differential signal received by the second decision device 15. The second square-wave signal input to the adjusting unit 13 actually includes two square-wave signals, and the two square-wave signals each correspond to one signal in the second differential signal received by the second decision device 15. In fact, the square-wave signal adjusted and then output by the adjusting unit 13 also includes two square-wave signals, and the two square-wave signals each correspond to one signal in the second square-wave signal received by the adjusting unit 13. The superimposer 12 has input ports corresponding to the two square-wave signals output by the adjusting unit 13. The second decision device 15 has input ports corresponding to the two square-wave signals output by the adjusting unit 13, so that the second decision device 15 can compare the two square-wave signals respectively with the two signals in the second differential signal.

Specifically, it is assumed that the two signals included in the second differential signal are a signal P and a signal N. The first decision device 14 compares a voltage amplitude of the signal P in the second differential signal with a set value of the signal P, and outputs a square-wave signal; the first decision device 14 compares a voltage amplitude of the signal N in the second differential signal with a set value of the signal N, and outputs a square-wave signal; the two square-wave signals form the first square-wave signal. In an implementation scenario, if the voltage amplitude of the signal P in the second differential signal is greater than the set value of the signal P and the voltage amplitude of the signal N is greater than the set value of the signal N at a same moment, the first decision device 14 may output two high-level differential first square-wave signals corresponding to the signal P and the signal N; if the voltage amplitude of the signal P in the second differential signal is less than the set value of the signal P and the voltage amplitude of the signal N is less than the set value of the signal N at a same moment, the first decision device 14 may output two low-level differential first square-wave signals corresponding to the signal P and the signal N; if the voltage amplitude of the signal P in the second differential signal is greater than the set value of the signal P and the voltage amplitude of the signal N is less than the set value of the signal N at a same moment, the first decision device 14 may output first square-wave signals of a high level corresponding to the signal P and of a low level corresponding to the signal N; if the voltage amplitude of the signal P in the second differential signal is less than the set value of the signal P and the voltage amplitude of the signal N is greater than the set value of the signal N at a same moment, the first decision device 14 may output first square-wave signals of a low level corresponding to the signal P and of a high level corresponding to the signal N. Alternatively, in another implementation scenario, a voltage amplitude each signal in the second differential signal may be compared with a set value of the signal, when a comparison result is less than, a high level corresponding to the signal is output; when a comparison result is greater than, a low level corresponding to the signal is output. Comparison and output principles and a size of the set value corresponding to each signal may be designed according to a requirement of a specific scenario, and are not limited in this embodiment of the present invention.

The second decision device 15 compares the voltage amplitude of the second differential signal with the voltage amplitude of the signal adjusted by the adjusting unit 13, and obtains the second square-wave signal. The comparison process is similar to that of the first decision device 14, and a difference lies in that: a reference value of the second differential signal is not a set value, but is the signal adjusted by the adjusting unit 13, and the signal is also a differential signal. Therefore, during comparison, the signal P in the second differential signal is also compared with a signal P in the second square-wave signal input to the feedback input end, and a square-wave signal is output; the signal N in the second differential signal is compared with a signal N in the second square-wave signal input to the feedback input end, and a square-wave signal is output; the two square-wave signals form the second square-wave signal.

Figure 2:
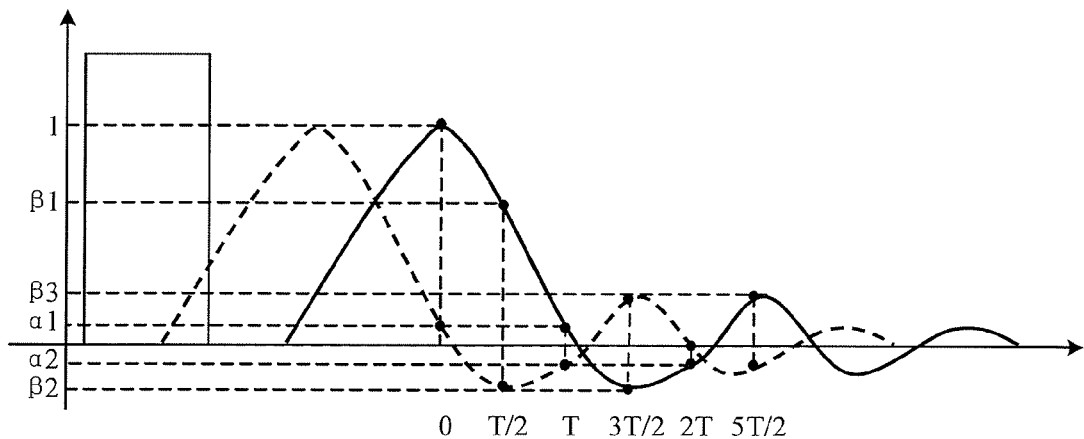
FIG. 2 is a unit impulse response in a case in which a transmission channel has ISI.

The second square-wave signal is input to the adjusting unit 13, and a principle of the adjustment on the differential signal by the adjusting unit 13 is as follows:

Intersymbol interference (Inter Symbol Interference, ISI) usually exists between the transmit end and the receive end. FIG. 2 is a unit impulse response in a case in which a transmission channel has ISI. In a situation where a transmission channel between the transmit end and the receive end is idle, a square-wave test signal is input, and a unit impulse response shown in FIG. 2 is obtained, where a solid-line curve represents a time domain waveform generated on the receive end when a differential signal passes through the transmission channel at a current moment, and a dotted-line curve represents a time domain waveform generated by the differential signal on the receive end at a previous moment.

It can be seen from FIG. 2 that, regarding the voltage amplitude of the differential signal, in addition to a voltage amplitude generated by a current differential signal, voltages generated at a current moment by differential signals at a previous moment and even an earlier moment are superimposed. Specifically, for the current signal P in the differential signal, in addition to a voltage amplitude generated by the current signal P, voltages generated at a current moment by the signal P at a previous moment and an earlier moment are further superimposed; for the signal N, in addition to a voltage amplitude generated by the current signal N, voltages generated at a current moment by the signal N at a previous moment and an earlier moment are further superimposed. In addition, what mainly affects the voltage amplitude of the current differential signal is a moment that is an integral multiple of a cycle of the differential signal, namely, 0, T, 2T, . . . , and nT. Therefore, the voltage amplitude of the differential signal at the current moment may be expressed as: $\alpha 1*T+\alpha 2*2T+\ldots+\alpha n*nT$, where $\alpha 1, \alpha 2, \ldots,$ and $\alpha n$ are coefficients, and values of $\alpha 1, \alpha 2, \ldots,$ and $\alpha n$ may be obtained by calculation according to FIG. 2. For example, a ratio of a value of a unit impulse response at a current sampling moment to a peak value of the unit impulse response may be selected, where the current sampling moment is an integral multiple of the cycle of the differential signal.

Similarly, regarding a data edge of each signal in the differential signal, namely, a tailing part of the differential signal, in addition to the voltage generated by the current differential signal, voltages generated at a current moment by a tail of a differential signal at a previous moment and even a tail of a differential signal at an earlier moment are superimposed. Specifically, for a tailing part of the signal P in the differential signal, in addition to a voltage generated by the current signal P, voltages generated at a current moment by a tail of the signal P at a previous moment and an earlier moment are further superimposed; for a tailing part of the signal N, in addition to a voltage generated by the current signal N, voltages generated at a current moment by a tail of the signal N at a previous moment and an earlier moment are further superimposed. What mainly affects the data edge of a current data differential signal is a moment that is an odd multiple of a half cycle of the data differential signal, namely, $T/2, 3T/2, \ldots,$ and $(2n+1)T/2$. Therefore, the data edge of the differential signal at the current moment may be expressed as: $0.5-(\beta 1-0.5)*T/2-(\beta 2-0.5)*3T/2-\ldots-(\beta n-0.5)*(2n+1)T/2)$, where $\beta 1, \beta 2, \ldots,$ and $\beta n$ are coefficients, and values of $\beta 1, \beta 2, \ldots,$ and $\beta n$ may be obtained by calculation according to FIG. 2. For example, a ratio of a value of a unit impulse response at a current sampling moment to a peak value of the unit impulse response may be selected, where the current sampling moment may be an odd multiple of the half cycle of the differential signal.

On this basis, the adjusting unit 13 may perform multiple times of phase delay for the second square-wave signal output by the second decision device 15. If the phase is delayed for an integral multiple of the cycle of the local clock each time and a plurality of obtained signals is added up, where differential signals in a previous cycle and even an earlier cycle are superimposed in the obtained signals, interference on the voltage amplitude of the second square-wave signal output by the second decision device 15 can be decreased; if the phase is delayed for an odd multiple of a half cycle of the local clock each time and a plurality of obtained signals is added up, where differential signals in a previous half cycle and even an earlier half cycle are superimposed in the obtained signals, tailing interference on the data edge of the second square-wave signal output by the second decision device 15 is canceled.

Figure 3:
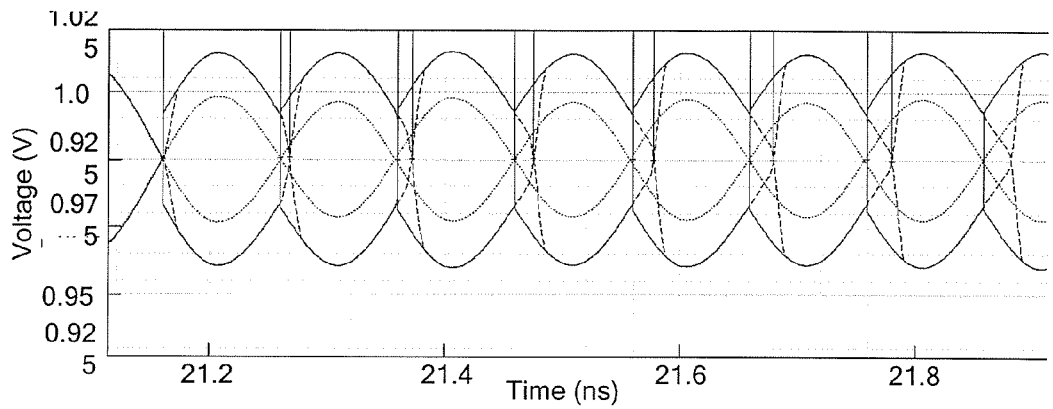
FIG. 3 is a diagram of time domain waveforms of a differential signal before and after it is processed by an adjusting unit.

The foregoing adjustment principle may be used for each signal in the differential signal, but an amplitude of an adjusted signal may be increased generally. In addition, the differential signal usually includes two signals: one is positive and the other is negative. Therefore, amplitudes of the two positive and negative differential signals are both increased. FIG. 3 is a diagram of time domain waveforms of a differential signal before and after it is processed by the adjusting unit, where dotted lines formed by dots represent waveform diagrams before the processing by the adjusting unit, and solid lines represent waveform diagrams after the processing by the adjusting unit. It can be seen from an analysis of FIG. 3 that, if only one decision device is used for both adjustment of the feedback loop and output, the waveform diagrams of the two signals move upward and downward separately, which will make crosspoints of the two signals delayed. That is, decision points of the differential decision device are delayed, so that jitter is increased. In this embodiment, one decision device, namely, the second decision device, and the superimposer form the feedback loop, which adjusts the differential signal received by the receive end; another decision device, namely, the first decision device, is used as an output decision device of the decision feedback equalizer to output the adjusted signal.

In actual implementation, a value of one phase delay may be estimated first, for example, the phase is delayed for one cycle of the local clock. After a link is established according to the solution of this embodiment, an oscilloscope is used to continue to observe an output waveform diagram of the first decision device 14, and the value of the phase delay is re-adjusted according to the output waveform diagram; or, the phase may not be delayed first, but a value of a decision point delay displayed in the output waveform diagram of the first decision device 14 is measured directly, and then the value of the phase delay of the adjusting unit 13 is determined according to the displayed value. Therefore, the second differential signal is moved backward as a whole, so that positions of the decision points are close to decision points of the original signal (the first differential signal) as much as possible, so as to decrease data edge jitter of the differential signal.

In the decision feedback equalizer according to this embodiment, one decision device and a superimposer are adopted to form a feedback loop, so as to adjust a differential signal received by a receive end, and another decision device is adopted as an output decision device of the decision feedback equalizer and outputs a signal obtained after the adjustment, so that signal decision points after the adjustment are located in proper positions, thereby decreasing jitter of an output differential signal.

Optionally, the adjusting unit 13 may be specifically configured to perform phase delay at least once for the second square-wave signal output by the second decision device 15, where the phase is delayed for an integral multiple of the cycle of the local clock each time, add up at least one obtained signal, and then separately input a signal obtained after the adding-up to the superimposer 12 and the feedback input end of the second decision device 15.

Figure 4:
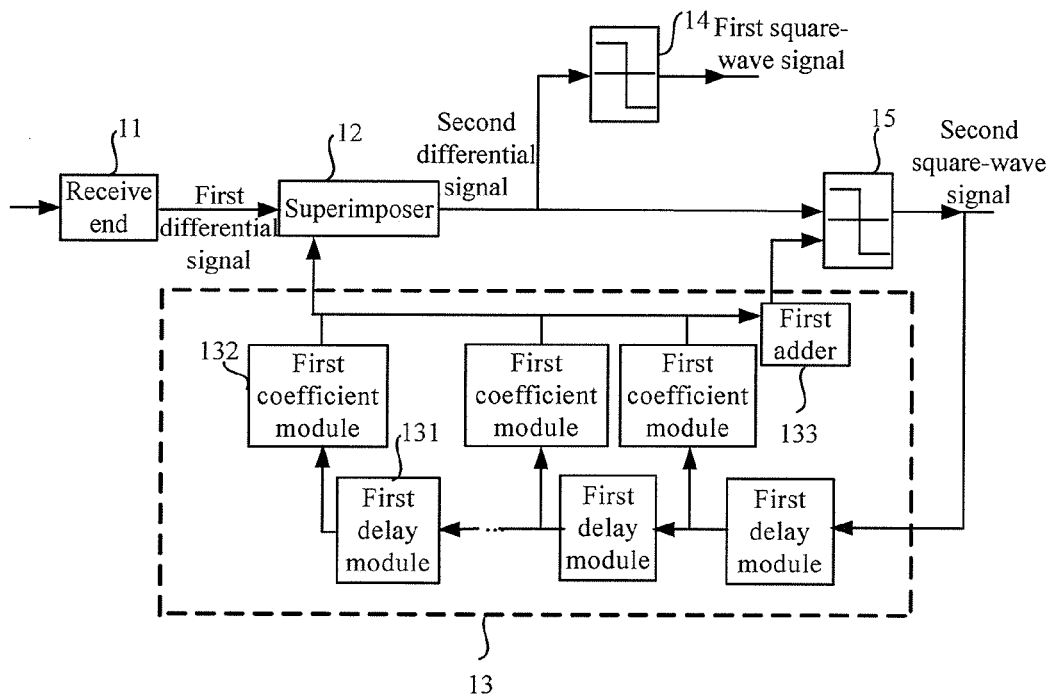
FIG. 4 is a schematic structural diagram of a second embodiment of a decision feedback equalizer according to the present invention.

FIG. 4 is a schematic structural diagram of a second embodiment of a decision feedback equalizer according to the present invention. As shown in FIG. 4, as a possible structure, the adjusting unit 13 may include a first delay module 131, a first coefficient module 132 and a first adder 133.

The first delay module 131 is configured to perform phase delay for the second square-wave signal, where the phase is delayed for an integral multiple of the cycle of the local clock, and input an obtained signal to the first coefficient module 132.

The first coefficient module 132 is configured to adjust a voltage amplitude of a signal that is adjusted and then output by the first delay module 131, and input an obtained signal to the first adder 133.

The first adder 133 is configured to add up signals input by a plurality of first coefficient modules 132, and separately input an obtained signal to the superimposer 12 and the feedback input end of the second decision device 15.

Based on the foregoing description, a voltage amplitude of each signal in a differential signal at a current moment may be expressed as:

$$\alpha_1 * T + \alpha_2 * 2T + \ldots + \alpha_n * nT.$$

A plurality of first delay modules 131 may be arranged on the adjusting unit 13, and these first delay modules 131 may be configured to separately perform phase delay once for the second square-wave signal to obtain a plurality of signals, which are obtained by delaying the second square-wave signal for T, 2T, ..., and nT. That is, phases delayed by the first delay modules 131 may be different, and the plurality of first delay modules 131 may be configured to separately delay the second square-wave signal for T, 2T, ..., and nT.

Correspondingly, the first coefficient module 132 is configured to multiply the voltage amplitude of the signal input by the first delay module 131 by $\alpha_n$, where a value of $\alpha_n$ is a ratio of a value of a unit impulse response at a current sampling moment to a peak value of the unit impulse response. Specifically, a plurality of first coefficient modules 132 may be arranged on the adjusting unit 13, and each first coefficient module 132 may correspond to one first delay module 131. For example, one first coefficient module 132 may correspond to a first delay module 131 that is configured to delay the second square-wave signal for T, and may be configured to adjust a voltage amplitude of a delayed signal obtained after delay adjustment by the first delay module 131, for example, multiply the voltage amplitude by $\alpha_1$, to obtain a signal after the adjustment; another first coefficient module 132 may correspond to a first delay module 131 that is configured to delay the second square-wave signal for 2T, and may be configured to adjust an voltage amplitude of a delayed signal obtained after delay adjustment by the first delay module 131, for example, multiply the voltage amplitude by $\alpha_2$, to obtain another signal after the adjustment; ..., and one first coefficient module 132 may correspond to a first delay module 131 that is configured to delay the second square-wave signal for nT, and may be configured to adjust an voltage amplitude of a delayed signal obtained after delay adjustment by the first delay module 131, for example, multiply the voltage amplitude by $\alpha_n$, to obtain another signal after the adjustment.

The first adder 133 adds up a plurality of signals obtained after the adjustment and input by the plurality of first coefficient modules 132, and input an obtained signal to the superimposer 12 and the feedback input end of the second decision device 15.

The superimposer 12 superimposes the signal adjusted by the adjusting unit 13 on the signal received by the receive end, and then inputs an obtained signal to the differential input end of the first decision device 14. The first decision device 14 compares the signal obtained after the superimposition with a preset value, and obtains and outputs the first square-wave signal.

In order to simplify the structure of the adjusting unit 13, as a possible implementation manner, as shown in FIG. 4, the plurality of first delay modules 131 in the adjusting unit 13 may be connected in series, an input end of each first coefficient module 132 may be connected to an output end of one first delay module 131, and an output end of each first coefficient module 132 is connected to an input end of the superimposer 12. In this implementation scenario, each first delay module 131 may delay the second square-wave signal for an equal time, for example, for one cycle T, and numbers of first delay modules between adjacent first coefficient modules 132 are equal.

Optionally, the numbers of first delay modules 131 between adjacent first coefficient modules 132 are equal. As shown in FIG. 4, one first delay module 131 may be arranged between adjacent first coefficient modules 132, so that the adjusting unit 13 is able to superimpose all differential signals in an integral multiple of the cycle before a differential signal at a current moment on the differential signal at the current moment, thereby canceling an effect of voltage amplitudes of all the differential signals in the integral multiple of the cycle before the differential signal at the current moment on a voltage amplitude of the current differential signal.

In specific implementation of the foregoing embodiment, the first adder 133 may also be replaced with a component capable of performing a function operation, such as a subtractor, or a component capable of performing weighted processing on signals that are adjusted and then output by the plurality of first coefficient modules 132, to adapt to adjustment for various requirements.

Figure 5:
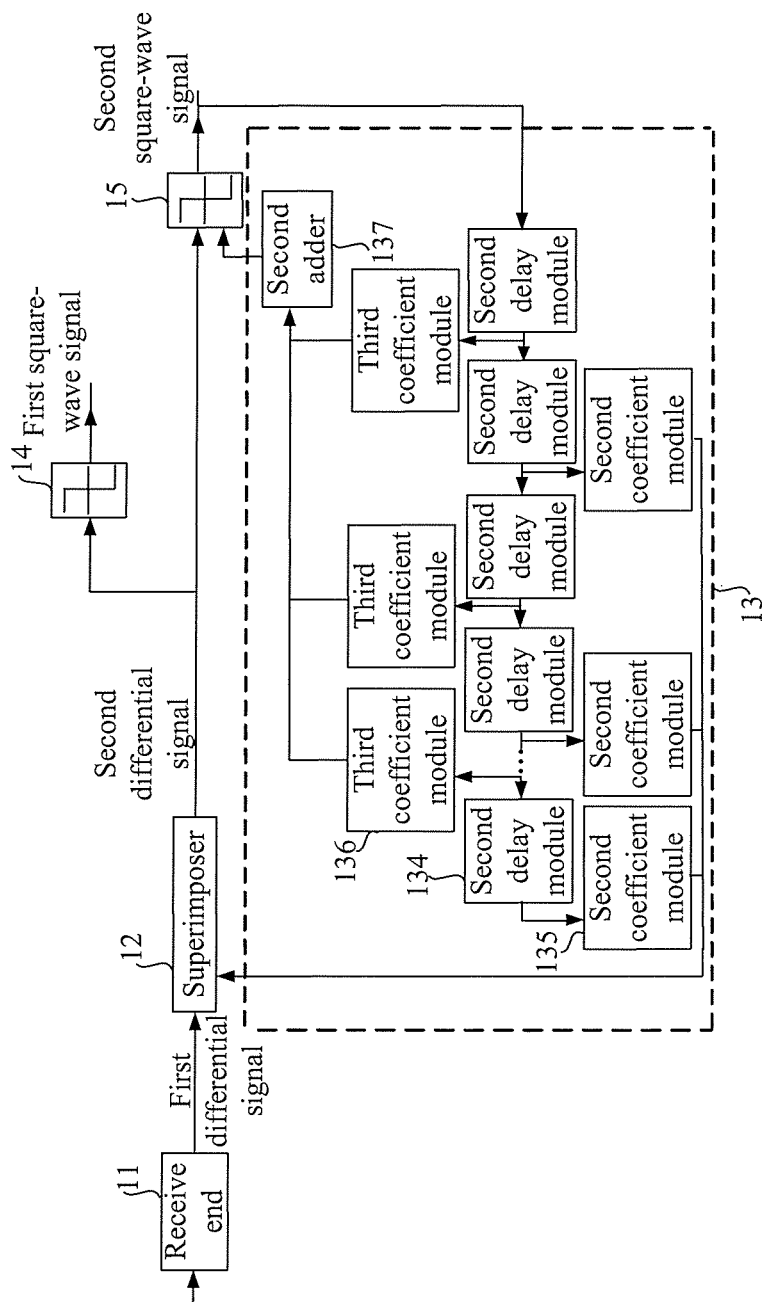
FIG. 5 is a schematic structural diagram of a third embodiment of a decision feedback equalizer according to the present invention.

FIG. 5 is a schematic structural diagram of a third embodiment of a decision feedback equalizer according to the present invention. In this embodiment, on a basis of adjustment of a voltage amplitude of a differential signal, the adjusting unit 13 may further adjust a data edge of the differential signal, to further decrease jitter of the differential signal. Specifically, the adjusting unit 13 is specifically configured to perform phase delay at least once for the second square-wave signal output by the second decision device 15, where the phase is delayed for an integral multiple of the cycle of the local clock each time, add up at least one obtained signal, and then input a signal obtained after the adding-up to the superimposer; or perform phase delay at least once for the second square-wave signal output by the second decision device 15, where the phase is delayed for an odd multiple of the half cycle of the local clock each time, add up at least one obtained signal, and then input a signal obtained after the adding-up to the feedback input end of the second decision device 15.

As shown in FIG. 5, as a possible structure, the adjusting unit 13 may include:

a second delay module 134, a second coefficient module 135, a third coefficient module 136, and a second adder 137.

The second delay module 134 is configured to perform phase delay for the second square-wave signal, where the phase is delayed for an odd multiple of the half cycle of the local clock.

The second coefficient module 135 is configured to adjust a voltage amplitude of a signal that is adjusted and then output by an even number of second delay modules 134, and input an obtained signal to the superimposer 12.

The third coefficient module 136 is configured to adjust a voltage amplitude of a signal that is adjusted and then output by an odd number of second delay modules 134, and input an obtained signal to the second adder 137.

The second adder 137 is configured to add up signals input by a plurality of third coefficient modules 136, and input an obtained signal to the feedback input end of the second decision device 15.

A plurality of second delay modules 134 may be arranged on the adjusting unit 13, and these second delay modules 134 may be configured to separately perform phase delay once for the second square-wave signal, where the phase is delayed for the half cycle of the local clock each time, to obtain a plurality of delayed signals that are obtained by delaying the second square-wave signal for $T/2, T, 3T/2, 2T, \ldots, nT$, and $(2n+1)T/2$. That is, a signal adjusted and then output by the even number of second delay modules 134 is a delayed signal with a delay of an integral multiple of the cycle of the local clock, and a signal adjusted and then output by the odd number of second delay modules 134 is a delayed signal with a delay of an odd multiple of the half cycle of the local clock.

Further, optionally, the second coefficient module 135 is configured to multiply the voltage amplitude of the signal that is adjusted and then output by the even number of second delay modules 134, by $\alpha n$, where a value of $\alpha n$ is a ratio of a value of a unit impulse response at a current sampling moment to a peak value of the unit impulse response. In this case, an actual effect of the second coefficient module 135 is similar to the first coefficient module 132 in the second embodiment shown in FIG. 4. In specific implementation, a plurality of second coefficient modules 135 may also be arranged, and each second coefficient module 135 may correspond to one second delay module 134. That is, the 2n-th second coefficient module 135 may correspond to a second delay module that is configured to delay the second square-wave signal for nT, and may be configured to adjust a voltage amplitude of a delayed signal obtained after the second delay module 134 imposes a delay of an integral multiple of the cycle, for example, multiply the voltage amplitude by $\alpha n$, to obtain a signal after the adjustment.

Correspondingly, the third coefficient module 136 may be configured to adjust the voltage amplitude of the signal that is obtained after the adjustment by the second delay module 134. A voltage amplitude adjustment range of the third coefficient module 136 may vary with the delay of the second delay module 134.

It can be known from the foregoing description that, what mainly affects the data edge of the current differential signal is a moment that is an odd multiple of a half cycle of the differential signal, namely, $T/2, 3T/2, \ldots,$ and $(2n+1)T/2$. In addition, the data edge of each signal in the differential signal at a current moment may be expressed as: $0.5-(\beta 1-0.5)*T/2-(\beta 2-0.5)*3T/2- \ldots -(\beta n-0.5)*(2n+1)T/2)$, where $\beta 1, \beta 2, \ldots,$ and $\beta n$ are coefficients, and values of $\beta 1, \beta 2, \ldots,$ and $\beta n$ may be obtained by calculation according to FIG. 2.

In this embodiment, optionally, the third coefficient module 136 is specifically configured to multiply the voltage amplitude of the signal that is adjusted and then output by the odd number of second delay modules 134, by $(\beta m-0.5)$, where a value of $\beta m$ is a ratio of a value of a unit impulse response at a current sampling moment to a peak value of the unit impulse response, m is a numerical value of the odd multiple of the half cycle of the local clock, m is an odd number, for example, m=2n+1, and the current sampling moment is 2n+1 times the half cycle of the local clock.

Correspondingly, each third coefficient module 136 may correspond to one second delay module 134. For example, one third coefficient module 136 may correspond to a second delay module 134 that is configured to delay the second square-wave signal for T/2, and may be configured to adjust a voltage amplitude of a signal obtained after delay adjustment by the second delay module 134, for example, multiply the voltage amplitude by $(\beta 1-0.5)$, to obtain a signal after the adjustment; another third coefficient module 136 may correspond to a second delay module 134 that is configured to delay the second square-wave signal for 3T/2, and may be configured to adjust a voltage amplitude of a signal obtained after delay adjustment by the second delay module 134, for example, multiply the voltage amplitude by $(\beta 2-0.5)$, to obtain a signal after the adjustment; . . . and one third coefficient module 136 may correspond to a second delay module 134 that is configured to delay the second square-wave signal for (2n+1)T/2, and may be configured to delay a voltage amplitude of a signal obtained after delay adjustment by the second delay module 134, for example, multiply the voltage amplitude by $(\beta n-0.5)$, to obtain a signal after the adjustment.

A plurality of signals obtained after the adjustment by the plurality of third coefficient modules 136 are added up by the second adder 137, and an obtained signal is input to the feedback input end of the second decision device 15. A plurality of signals obtained after the adjustment by the plurality of second coefficient modules 135 are input to the superimposer 12, and then superimposed on the first differential signal received by the receive end 11.

In order to simplify the structure of the adjusting unit 13, as a possible implementation manner, as shown in FIG. 5, the plurality of second delay modules 134 in the adjusting unit 13 is connected in series, an input end of each second coefficient module 135 is connected to an output end of an even number-th second delay module 134, and an output end of each second coefficient module 135 is connected to an input end of the superimposer 12; an input end of each third coefficient module 136 is connected to an output end of an odd number-th second delay module 134, and an output end of each third coefficient module 136 is connected to the second adder 137.

In this implementation scenario, each of the second delay modules 134 may delay the second square-wave signal for an equal time, for example, for a half cycle T/2, and numbers of second delay modules between adjacent second coefficient modules 135 and between adjacent third coefficient modules 136 are equal. As shown in FIG. 5, one second delay module 134 may be arranged between adjacent second coefficient modules 135, so that the adjusting unit 13 is able to superimpose all differential signals in an integral multiple of the cycle before a differential signal at a current moment on the differential signal at the current moment, thereby canceling an effect of voltage amplitudes of all the differential signals in the integral multiple of the cycle before the differential signal at the current moment on a voltage amplitude of the current differential signal; one second delay module 134 may be arranged between adjacent third coefficient modules 136, so that the adjusting unit 13 is able to superimpose all differential signals in an odd multiple of the half cycle before a differential signal at a current moment on the differential signal at the current moment, thereby canceling an effect of data edges of all the differential signals in the odd multiple of the half cycle before the differential signal at the current moment on a data edge of the current differential signal.

In specific implementation of the foregoing embodiment, the second adder 137 may also be replaced with a component capable of performing a function operation, such as a subtractor, or a component capable of performing weighted processing on signals that are adjusted and then output by the plurality of third coefficient modules 136, to adapt to adjustment for various requirements.

Figure 6:
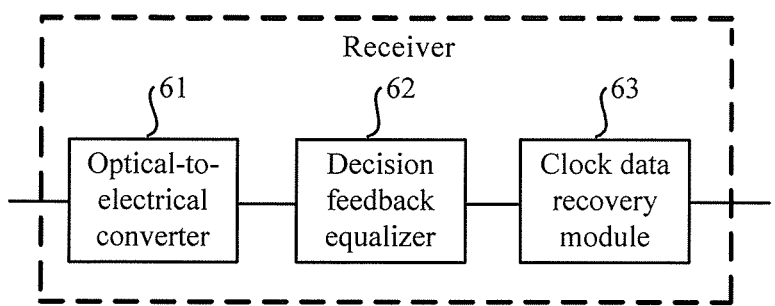
FIG. 6 is a schematic structural diagram of a first embodiment of a receiver according to the present invention.

FIG. 6 is a schematic structural diagram of a first embodiment of a receiver according to the present invention. As shown in FIG. 6, the receiver includes: an optical-to-electrical converter 61, a decision feedback equalizer 62 and a clock data recovery module 63.

The optical-to-electrical conversion module 61 is configured to convert a received optical signal into an electrical signal, and input the electrical signal to the decision feedback equalizer as a first differential signal.

The decision feedback equalizer 62 may be the decision feedback equalizer disclosed by any of the foregoing embodiments, and may include a receive end, a superimposer, an adjusting unit, a first decision device and a second decision device. The receive end is configured to receive a first differential signal, synchronize a local clock with a frequency of the first differential signal to make a cycle of the local clock consistent with a cycle of the first differential signal, and input the first differential signal to the superimposer; the superimposer is configured to superimpose the first differential signal input by the receive end on a square-wave signal output by the adjusting unit, to obtain a second differential signal, and separately input the second differential signal to a differential input end of the first decision device and a differential input end of the second decision device; the adjusting unit is configured to perform phase and/or amplitude adjustment for a second square-wave signal output by the second decision device, and separately input a square-wave signal obtained after the adjustment to the superimposer and a feedback input end of the second decision device; the first decision device is configured to compare a voltage amplitude of the second differential signal input to the differential input end of the first decision device with a set value, and output a first square-wave signal; the second decision device is configured to compare a voltage amplitude of the second differential signal input to the differential input end of the second decision device with a voltage amplitude of a square-wave signal that is input to the feedback input end and is adjusted by the adjusting unit, and input an obtained second square-wave signal to the adjusting unit.

The clock data recovery module 63 is configured to receive the first square-wave signal output by the first decision device of the decision equalizer, and synchronize the local clock with the first square-wave signal. Specifically, the clock data recovery module 63 performs synchronization processing for the local clock, so that the local clock is consistent with a phase and a frequency of the received first square-wave signal, so as to facilitate sampling accuracy.

In specific implementation, the optical-to-electrical converter 61 may be an avalanche photodiode (APD).

The receiver according to this embodiment of the present invention may be arranged on an optical network device such as an OLT, an ONU or an ONT. For a structure and a function of the decision feedback equalizer, reference may be made to the embodiments of the decision feedback equalizers in FIG. 1, FIG. 4 or FIG. 5, and details are not described herein again.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A decision feedback equalizer, comprising:
a receive end, a superimposer, an adjusting unit, a first decision device and a second decision device;
wherein the receive end is configured to receive a first differential signal, synchronize a local clock with a frequency of the first differential signal to make a cycle of the local clock consistent with a cycle of the first differential signal, and input the first differential signal to the superimposer;
wherein the superimposer is configured to: superimpose the first differential signal input by the receive end on a square-wave signal output by the adjusting unit to obtain a second differential signal; and input the second differential signal to a differential input end of the first decision device and a differential input end of the second decision device;
wherein the adjusting unit is configured to perform at least one of phase adjustment and amplitude adjustment for a second square-wave signal output by the second decision device, and input a square-wave signal obtained after the adjustment to the superimposer and a feedback input end of the second decision device;
wherein the first decision device is configured to compare a voltage amplitude of the second differential signal input to the differential input end of the first decision device with a set value, and output a first square-wave signal; and
wherein the second decision device is configured to compare the voltage amplitude of the second differential signal input to the differential input end of the second decision device with a voltage amplitude of the square-wave signal that is input to the feedback input end by the adjusting unit, and input the second square-wave signal to the adjusting unit.

2. The decision feedback equalizer according to claim 1, wherein the adjusting unit is configured to:
perform phase delay at least twice for the second square-wave signal output by the second decision device, wherein a phase of the second square-wave signal is delayed for an integral multiple of the cycle of the local clock each time,
add up the phase delayed signals that are voltage amplitude adjusted, and then separately input a signal obtained after the adding-up to the superimposer and the feedback input end of the second decision device.

3. The decision feedback equalizer according to claim 2, wherein the adjusting unit comprises:
   a first delay module, a first coefficient module and a first adder; wherein the first delay module is configured to perform phase delay for the second square-wave signal, wherein the phase is delayed for the integral multiple of the cycle of the local clock, and input the phase delayed signal to the first coefficient module;
   wherein the first coefficient module is configured to adjust a voltage amplitude of the second square-wave signal that is phase delayed by the first delay module, and input the phase delayed signal to the first adder; and
   wherein the first adder is configured to add up signals input by a plurality of first coefficient modules, and input the phase delayed signal to the superimposer and the feedback input end of the second decision device.

4. The decision feedback equalizer according to claim 3, wherein the first coefficient module is configured to multiply the voltage amplitude of the signal input by the first delay module by $αn$, wherein a value of $αn$ is a ratio of a value of a unit impulse response at a current sampling moment to a peak value of the unit impulse response, n is a numerical value of the integral multiple of the cycle of the local clock, n is an integer, and the current sampling moment is n times the cycle of the local clock, wherein $αn$ is greater than zero and less than or equal to one.

5. The decision feedback equalizer according to claim 3, wherein a plurality of first delay modules is connected in series, an input end of each of the first coefficient modules is connected to an output end of one of the first delay modules, and an output end of each of the first coefficient modules is connected to an input end of the first adder.

6. The decision feedback equalizer according to claim 5, wherein the first delay module comprises a plurality of delay modules connected in series, and wherein each of the first delay modules delays an input signal for an equal time, and the number of first delay modules between adjacent first coefficient modules are equal.

7. The decision feedback equalizer according to claim 1, wherein the adjusting unit is configured to:
   perform phase delay at least twice for the second square-wave signal output by the second decision device, wherein a phase of the second square-wave signal is delayed for an integral multiple of the cycle of the local clock each time, add up the phase delayed signals that are voltage amplitude adjusted, and then input a signal obtained after the adding-up to the superimposer; or
   perform phase delay at least once for the second square-wave signal output by the second decision device, wherein a phase is delayed for an odd multiple of a half cycle of the local clock each time, add up at least one obtained signal, and then input a signal obtained after the adding-up to the feedback input end of the second decision device.

8. The decision feedback equalizer according to claim 7, wherein the adjusting unit comprises:
   a second delay module, a second coefficient module, a third coefficient module, and a second adder;
   wherein the second delay module is configured to perform phase delay for the second square-wave signal, wherein the phase of the second square-wave signal is delayed for the odd multiple of the half cycle of the local clock;
   wherein the second coefficient module is configured to adjust the voltage amplitude of the second square-wave signal that is phase delayed and then output by an even number of second delay modules, and input the adjusted signal to the superimposer;
   wherein the third coefficient module is configured to adjust a voltage amplitude of the second square-wave signal that is phase delayed and then output by an odd number of second delay modules, and input the adjusted signal to the second adder; and
   wherein the second adder is configured to add up the adjusted signals input by a plurality of third coefficient modules, and input an obtained signal to the feedback input end of the second decision device.

9. The decision feedback equalizer according to claim 8, wherein:
   the second coefficient module is configured to multiply the voltage amplitude of the signal that is adjusted and then output by the even number of second delay modules, by $αn$, wherein a value of $αn$ is a ratio of a value of a unit impulse response at a current sampling moment to a peak value of the unit impulse response, n is a numerical value of the integral multiple of the cycle of the local clock, n is an integer, and the current sampling moment is n times the cycle of the local clock; and
   the third coefficient module is configured to multiply the voltage amplitude of the signal that is adjusted and then output by the odd number of second delay modules, by $(βm-0.5)$, wherein a value of $βm$ is a ratio of a value of a unit impulse response at a current sampling moment to a peak value of the unit impulse response, m is a numerical value of the odd multiple of the half cycle of the local clock, m is an odd number, and the current sampling moment is m times the half cycle of the local clock, wherein $βm$ is greater than zero and less than or equal to one.

10. The decision feedback equalizer according to claim 8, wherein:
    a plurality of second delay modules is connected in series, an input end of each second coefficient module is connected to an output end of an even number-th second delay module, and an output end of each second coefficient module is connected to the superimposer; and
    an input end of each of the third coefficient modules is connected to an output end of an odd number-th second delay module, and an output end of each of the third coefficient modules is connected to the second adder.

11. The decision feedback equalizer according to claim 8, wherein each of the second delay modules delays the second square-wave signal for an equal time, the number of second delay modules between adjacent second coefficient modules are equal, and the number of second delay modules between adjacent third coefficient modules are equal.

12. A receiver, comprising:
    an optical-to-electrical converter;
    a decision feedback equalizer according to claim 1;
    a clock data recovery module;
    wherein the optical-to-electrical conversion module is configured to convert a received optical signal into an electrical signal, and input the electrical signal to the decision feedback equalizer as the first differential signal; and
    wherein the clock data recovery module is configured to receive the first square-wave signal output by the first decision device in the decision feedback equalizer, and synchronize the local clock with the first square-wave signal.

13. The receiver according to claim 12, wherein the receiver is arranged on an optical line terminal (OLT), an optical network unit (ONU) or an optical network terminal (ONT).

* * * * *